(12) United States Patent
Sung et al.

(10) Patent No.: US 12,691,907 B2
(45) Date of Patent: Jul. 28, 2026

(54) APPARATUS FOR CONTROLLING AUTONOMOUS VEHICLE BASED ON PERFORMING A MINIMUM RISK MANEUVER AND METHOD THEREOF

(71) Applicants: Hyundai Motor Company, Seoul (KR); Kia Corporation, Seoul (KR)

(72) Inventors: Young Jin Sung, Seoul (KR); Dae Young Kim, Gwangmyeong (KR); Ji Hwan Park, Seoul (KR); Su Hong Chae, Hwaseong (KR); Chan Hee Jung, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 176 days.

(21) Appl. No.: 17/981,408

(22) Filed: Nov. 5, 2022

(65) Prior Publication Data

US 2023/0278588 A1 Sep. 7, 2023

(30) Foreign Application Priority Data

Mar. 3, 2022 (KR) ........................ 10-2022-0027559

(51) Int. Cl.
*B60W 60/00* (2020.01)
*B60W 50/14* (2020.01)
(Continued)

(52) U.S. Cl.
CPC ........ *B60W 60/0016* (2020.02); *B60W 50/14* (2013.01); *B60W 60/0053* (2020.02);
(Continued)

(58) Field of Classification Search
CPC ......... B60W 60/0016; B60W 60/0053; B60W 60/0057; B60W 60/0015; B60W 60/0059;
(Continued)

(56) References Cited

U.S. PATENT DOCUMENTS 6,028,537 A * 2/2000 Suman ................... B60K 35/00
340/988
10,583,843 B2 3/2020 Tamagaki et al.
(Continued)

FOREIGN PATENT DOCUMENTS

JP S5744076 A 3/1982
JP H11-167689 A 6/1999
(Continued)

OTHER PUBLICATIONS

Shanna Freeman "How OnStar Works" Feb. 8, 2006. HowStuffWorks. com. <https://auto.howstuffworks.com/onstar.htm> Jul. 11, 2024.*

*Primary Examiner* — Andrew R Dyer
(74) *Attorney, Agent, or Firm* — Fox Rothschild LLP

(57) ABSTRACT

An apparatus and a method for controlling an autonomous vehicle for a minimum risk maneuver (MRM) of the autonomous vehicle are provided. A processor provided in the autonomous vehicle performs an MRM including deceleration control and stop control of the autonomous vehicle, determines whether the MRM is completed, determines whether manipulation of a user for vehicle control is not input during a specific time, based on determination that the MRM is completed, and requests a call connection from an external institution, by means of a call controller provided in the autonomous vehicle to control a call with the external institution, when the MRM is completed and when the manipulation of the user for the vehicle control is not input during the specific time. The apparatus improves safety and convenience of an autonomous driving system.

20 Claims, 6 Drawing Sheets

(51) Int. Cl.
  *H04W 4/40* (2018.01)
  *B60W 50/00* (2006.01)
(52) U.S. Cl.
  CPC .......... *B60W 60/0057* (2020.02); *H04W 4/40*
    (2018.02); *B60W 2050/0063* (2013.01); *B60W*
    *2050/007* (2013.01); *B60W 2050/143*
    (2013.01); *B60W 2050/146* (2013.01); *B60W*
    *2556/45* (2020.02)
(58) Field of Classification Search
  CPC .......... B60W 60/007; B60W 60/0051; B60W
    30/146; B60W 30/08; B60W 30/143;
    B60W 30/181; B60W 50/14; B60W
    50/0098; B60W 2050/0063; B60W
    2050/007; B60W 2050/143; B60W
    2050/146; B60W 2050/0005; B60W
    2556/45; B60W 2556/50; B60W
    2540/215; B60W 2756/10; B60W 10/10;
    B60W 10/18; B60W 10/20; B60W 40/08;
    B60W 40/105; B60W 2520/04; B60W
    2520/10; B60R 25/01; B60R 25/34; B60R
    21/16; H04W 4/40
  USPC .......................................................... 701/23
  See application file for complete search history.

(56) References Cited

U.S. PATENT DOCUMENTS

| | | | |
|---|---|---|---|
| 10,759,445 B2 | 9/2020 | Matsumoto | |
| 11,787,425 B2 | 10/2023 | Shinoda et al. | |
| 2017/0072851 A1* | 3/2017 | Shenoy | G08G 1/096775 |
| 2017/0247918 A1* | 8/2017 | Oomi | E05F 15/77 |
| 2017/0305349 A1* | 10/2017 | Naboulsi | B60R 1/025 |
| 2018/0111628 A1 | 4/2018 | Tamagaki et al. | |
| 2018/0362052 A1 | 12/2018 | Matsumoto | |
| 2019/0283769 A1* | 9/2019 | Chiba | B60W 60/0054 |
| 2019/0291728 A1* | 9/2019 | Shalev-Shwartz | B60W 60/00274 |
| 2019/0313223 A1* | 10/2019 | Taylor | G07C 5/0825 |
| 2020/0135005 A1* | 4/2020 | Katz | H04M 7/0021 |
| 2020/0307646 A1* | 10/2020 | Kato | B60W 50/00 |
| 2022/0017107 A1 | 1/2022 | Shinoda et al. | |
| 2022/0048432 A1* | 2/2022 | Switalski | G08G 1/205 |
| 2023/0037318 A1* | 2/2023 | Foster | G05D 1/0027 |
| 2023/0106673 A1* | 4/2023 | Asghar | A61B 5/0533 382/104 |
| 2025/0065919 A1* | 2/2025 | Yu | B60W 50/038 |

FOREIGN PATENT DOCUMENTS

| | | |
|---|---|---|
| JP | H11-280515 A | 10/1999 |
| JP | 2014-019301 A | 2/2014 |
| JP | 2015-158733 A | 9/2015 |
| JP | 2018-060286 A | 4/2018 |
| JP | 2019-001317 A | 1/2019 |
| JP | 2020-063048 A | 4/2020 |
| JP | 2020-158022 A | 10/2020 |
| JP | 2021-091409 A | 6/2021 |
| WO | 2020/129523 A1 | 6/2020 |

* cited by examiner

| Automation Level | SAE Classification Criteria | System Role | Driver Role |
|---|---|---|---|
| LEVEL 0 | No Automation | Provide only temporary emergency intervention or warning | The driver does all the driving |
| LEVEL 1 | Driver Assistance | Perform some driving functions such as steering and acceleration/ deceleration together under the riding of the driver who is performing the driving function in the normal operating section | The driver determines whether/when the level 1 system operates and does the rest of the driving except for steering wheel or accelerator/decelerator pedal control (including driving environment/vehicle operation/level 1 system monitoring and immediate emergency preparedness). |
| LEVEL 2 | Partial Automation | Perform driving functions such as steering and acceleration/deceleration under the riding of the driver who is monitoring the steering and acceleration/deceleration devices on behalf of the driver | The driver determines whether/when the system operates and does the rest of the driving except for steering wheel or accelerator/ decelerator pedal control (including driving environment/ vehicle operation/level 2 system monitoring and immediate emergency preparedness). |
| LEVEL 3 | Conditional Automation | Hand over driving control authority to the driver and perform driving functions such as steering and acceleration/ deceleration, in situations other than the conditions | The driver determines whether/when the system operates and does the rest of the driving except for steering wheel or accelerator/ decelerator pedal control and driving environment monitoring (should take over the control authority of the level 3 system and perform emergency preparedness, when requesting to hand over the control authority of the level 3 system). |
| LEVEL 4 | High Automation | In extremely exceptional circumstances, the system performs all driving functions under the riding of the driver. | It is able to selectively perform emergency preparedness, when requesting to hand over the control authority of the level 4 system. |
| LEVEL 5 | Full Automation | Perform the fully driving function capable of responding to any situation without the driver | The driver only determines whether the system operates and does not perform all the driving. |

FIG. 1

APPARATUS FOR CONTROLLING AUTONOMOUS VEHICLE BASED ON PERFORMING A MINIMUM RISK MANEUVER AND METHOD THEREOF

CROSS-REFERENCE TO RELATED APPLICATION

This application is based on and claims under 35 U.S.C. § 119(a) the benefit of Korean Patent Application No. 10-2022-0027559, filed in the Korean Intellectual Property Office on Mar. 3, 2022, the entire contents of which are incorporated herein by reference.

TECHNICAL FIELD

Embodiments of the present disclosure relate to an apparatus for controlling an autonomous vehicle and a method thereof, and more particularly, relates to an apparatus for controlling an autonomous vehicle for a minimum risk maneuver (MRM) of the autonomous vehicle and a method thereof.

BACKGROUND

An autonomous vehicle needs a capability of adaptively coping with a surrounding situation which changes in real time while driving. First of all, a reliable determination control function is required to mass produce and enable autonomous vehicles. A semi-autonomous vehicle recently on the market basically performs driving, braking, and steering on behalf of a driver to reduce fatigue of the driver. Unlike fully autonomous driving, semi-autonomous driving should allow the driver to keep focusing on the driving, for example, should allow the driver to continue holding the steering wheel. Recently, the semi-autonomous vehicle is loaded with a highway driving assist (HDA) function, a driver status warning (DSW) function of determining driver carelessness, such as drowsy driving or gaze departure, and state abnormality and outputting a waning alarm through a cluster or the like, a driver awareness warning (DAW) function of determining whether the vehicle crosses the line and performs unstable driving by means of a front view camera, a forward collision-avoidance assist (FCA) or active emergency brake system (AEBS) function of performing emergency braking when detecting a head on collision, or the like to be sold.

After outputting a transition demand (TD) from an existing autonomous driving system of the autonomous vehicle to a driver, when the driver does not take over control authority during a specific time, the existing autonomous driving system automatically performs a minimum risk maneuver (MRM). In an MRM mode, the autonomous vehicle performs deceleration and stop, but does not have preparation for a critical situation. Thus, there is a need to develop a technology of allowing a driver to cope with a critical situation in the process of performing the MRM.

SUMMARY

An exemplary embodiment of the present disclosure provides an apparatus for controlling an autonomous vehicle for a minimum risk maneuver (MRM) of the autonomous vehicle and a method thereof.

Another exemplary embodiment of the present disclosure provides an apparatus for controlling an autonomous vehicle to allow a driver to determine and cope with a critical situation and a method thereof.

Another exemplary embodiment of the present disclosure provides an apparatus for controlling an autonomous vehicle to request help from an external institution in a critical situation and a method thereof.

Another exemplary embodiment of the present disclosure provides an apparatus for controlling an autonomous vehicle to control a door of the autonomous vehicle to smoothly proceed with rescue in a critical situation and a method thereof.

Another exemplary embodiment of the present disclosure provides an apparatus for controlling an autonomous vehicle to improve safety and convenience of an autonomous driving system and a method thereof.

The technical problems to be solved by the present disclosure are not limited to the aforementioned problems, and any other technical problems not mentioned herein will be clearly understood from the following description by those skilled in the art to which the present disclosure pertains.

According to an exemplary embodiment of the present disclosure, an apparatus for controlling an autonomous vehicle may include a processor provided in the autonomous vehicle and a memory storing instructions executable by the processor. The processor may perform a minimum risk maneuver (MRM) including deceleration control and stop control of the autonomous vehicle, may determine whether the MRM is completed, may determine whether manipulation of a user for vehicle control is not input during a specific time, based on determination that the MRM is completed, and may requests a call connection from an external institution, by means of a call controller configured to control a call with the external institution, when the MRM is completed and when the manipulation of the user for the vehicle control is not input during the specific time.

In an exemplary embodiment, the apparatus may further include a human machine interface (HMI) provided in the autonomous vehicle to receive a cancel command for the call connection from the user. The processor may cancel the request for the call connection, when the cancel command is input through the HMI.

In an exemplary embodiment, the HMI may receive the cancel command for the call connection through an audio, video, navigation (AVN) provided in the autonomous vehicle.

In an exemplary embodiment, the apparatus may further include a door controller that controls a door of the autonomous vehicle to be locked or unlocked. The processor may unlock the door by means of the door controller, when requesting the call connection.

In an exemplary embodiment, the processor may lock the door by means of the door controller, when a door lock button of the autonomous vehicle is input by the user.

In an exemplary embodiment, the processor may lock the door by means of the door controller, when a speed of the autonomous vehicle arrives at a specific speed by manipulation of the user or when a shift lever of the autonomous vehicle is manipulated by the user.

In an exemplary embodiment, the apparatus may further include an HMI provided in the autonomous vehicle to receive a cancel command for the call connection from the user. The processor may maintain the door in a lock state by means of the door controller, when the cancel command is input through the HMI.

In an exemplary embodiment, the apparatus may further include a door controller that controls a door of the autonomous vehicle to be locked or unlocked. The processor may unlock the door by means of the door controller, when an agent call occurs in response to the call connection.

In an exemplary embodiment, the processor may disable autonomous driving of the autonomous vehicle, when the manipulation of the user is input while the MRM is being performed.

In an exemplary embodiment, the manipulation of the user may include at least one of an input of an autonomous driving operation button provided in the autonomous vehicle, holding of a steering wheel of the autonomous vehicle, manipulation of the steering wheel, an input of a brake provided in the autonomous vehicle, or an operation of a brake override system of the autonomous vehicle.

In an exemplary embodiment, the processor may perform the MRM, when an airbag of the autonomous vehicle is operated, when the autonomous vehicle or a system included in the autonomous vehicle fails, or when a transition demand (TD) occurs during autonomous driving of the autonomous vehicle and the TD is ended because the user does not take over control authority of the autonomous vehicle.

According to another exemplary embodiment of the present disclosure, a method for controlling an autonomous vehicle may include performing, by a processor, a minimum risk maneuver (MRM) including deceleration control and stop control of the autonomous vehicle, determining, by the processor, whether the MRM is completed, determining, by the processor, whether manipulation of a user for vehicle control is not input during a specific time, based on determination that the MRM is completed, and requesting, by processor, a call connection from an external institution, by means of a call controller provided in the autonomous vehicle and configured to control a call with the external institution, when the MRM is completed and when the manipulation of the user for the vehicle control is not input during the specific time.

In an exemplary embodiment, the method may further include receiving, by an HMI provided in the autonomous vehicle, a cancel command for the call connection from the user and canceling, by the processor, the request for the call connection, when the cancel command is input through the HMI.

In an exemplary embodiment, the receiving of the cancel command for the call connection from the user by the HMI may include receiving, by the HMI, the cancel command for the call connection through an AVN provided in the autonomous vehicle.

In an exemplary embodiment, the method may further include unlocking, by the processor, a door of the autonomous vehicle by means of a door controller configured to control the door of the autonomous vehicle to be locked or unlocked, when requesting the call connection.

In an exemplary embodiment, the method may further include locking, by the processor, the door by means of the door controller, when a door lock button of the autonomous vehicle is input by the user.

In an exemplary embodiment, the method may further include locking, by the processor, the door by means of the door controller, when a speed of the autonomous vehicle arrives at a specific speed by manipulation of the user or when a shift lever of the autonomous vehicle is manipulated by the user.

In an exemplary embodiment, the method may further include receiving, by an HMI provided in the autonomous vehicle, a cancel command for the call connection from the user and maintaining, by the processor, the door in a lock state, when the cancel command is input through the HMI.

In an exemplary embodiment, the method may further include unlocking, by the processor, a door of the autonomous vehicle by means of a door controller configured to control the door of the autonomous vehicle to be locked or unlocked, when an agent call occurs in response to the call connection.

In an exemplary embodiment, the performing of the MRM by the processor may include disabling, by the processor, autonomous driving of the autonomous vehicle, when the manipulation of the user is input while the MRM is being performed.

As discussed, the method and system suitably include use of a controller or processer.

In another embodiment, vehicles are provided that comprise an apparatus as disclosed herein.

In a fully autonomous vehicle or system, the vehicle may perform all driving tasks under all conditions and little or no driving assistance is required from a human driver. In semi-autonomous vehicle, for example, the automated driving system may perform some or all parts of the driving task in some conditions, but a human driver regains control under some conditions, or in other semi-autonomous systems, the vehicle's automated system may oversee steering and accelerating and braking in some conditions, although the human driver is required to continue paying attention to the driving environment throughout the journey, while also performing the remainder of the necessary tasks.

In certain embodiments, the present systems and vehicles may be fully autonomous. In other certain embodiments, the present systems and vehicles may be semi-autonomous.

BRIEF DESCRIPTION OF THE DRAWINGS

The above and other objects, features and advantages of the present disclosure will be more apparent from the following detailed description taken in conjunction with the accompanying drawings:

FIG. 1 is a table where an automation level of an autonomous vehicle is defined;

DETAILED DESCRIPTION

Figure 2:
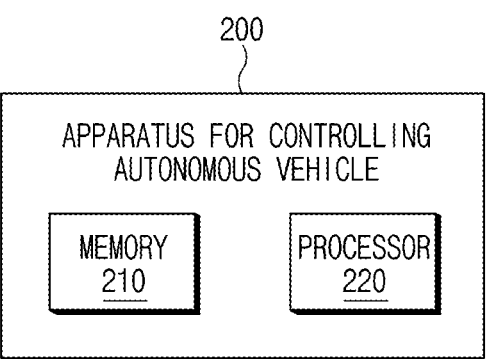
FIG. 2 is a block diagram illustrating an apparatus for controlling an autonomous vehicle according to an exemplary embodiment of the present disclosure.

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like.

Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, embodiments of the present disclosure will be described in detail with reference to FIGS. 1 to 6.

FIG. 1 is a table where an automation level of an autonomous vehicle is defined.

An autonomous vehicle refers to a vehicle which recognizes a driving environment by itself to determine risk, controls its driving route to minimize driving manipulation of a driver, and drives itself.

Finally, the autonomous vehicle refers to a vehicle capable of performing driving, steering, and parking without influence of persons and is focused on a vehicle where an autonomous driving technology, which is the core foundation of the autonomous vehicle, -that is, a capability of operating the vehicle without active control or monitoring of the driver—is developed to the highest degree.

Referring to FIG. 1, the driving environment is monitored by the driver in automation levels LEVELs 0 to 2. On the other hand, the driving environment is monitored by the automated driving system in automation levels LEVELs 3 to 5.

However, the concept of autonomous vehicles currently on the market may include an intermediate automation level to a fully autonomous vehicle and may correspond to a goal-oriented concept premised on the mass production and commercialization of fully autonomous vehicles.

An autonomous driving control method according to an exemplary embodiment of the present disclosure is applicable to an autonomous vehicle corresponding to LEVEL 3 (conditional automation) in autonomous driving automation levels shown in FIG. 1, but is not necessarily limited thereto, and is applicable to an autonomous vehicle supporting a plurality of various automation levels.

An automation level of the autonomous vehicle may be classified as shown in a table of FIG. 1 based on the society of automotive engineers (SAE).

FIG. 2 is a block diagram illustrating an apparatus for controlling an autonomous vehicle according to an exemplary embodiment of the present disclosure.

An apparatus 200 for controlling an autonomous vehicle according to an exemplary embodiment of the present disclosure may be implemented inside or outside a vehicle. In this case, the apparatus 200 for controlling the autonomous vehicle may be integrally configured with control units in the vehicle or may be implemented as a separate hardware device to be connected with the control units of the vehicle by a connection means.

As an example, the apparatus 200 for controlling the autonomous vehicle may be integrally configured with the vehicle or may be implemented as a separate configuration independent of the vehicle in the form of being installed/attached to the vehicle. Alternatively, a part of the apparatus 200 for controlling the autonomous vehicle may be integrally configured with the vehicle and the other may be implemented as a separate configuration independent of the vehicle in the form of being installed/attached to the vehicle.

Referring to FIG. 2, the apparatus 200 for controlling the autonomous vehicle may include a memory 210 and a processor 220.

The memory 210 and the processor 220 may be included in a controller or an autonomous driving controller of the autonomous vehicle.

The processor 220 may perform data processing and/or calculation described below. Furthermore, the memory 210 may store data or an algorithm required in a process of performing data processing and/or calculation.

As an example, the memory 210 may store instructions executed by the processor 220.

The processor 220 may be an electric circuit which executes a command of software. For example, the processor 220 may be an electronic control unit (ECU), a micro controller unit (MCU), or another sub-controller.

The memory 210 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

A call controller (not shown) may be provided in the autonomous vehicle to control a call with an external institution.

As an example, the call controller (not shown) may control a call between the autonomous vehicle and the external institution.

As an example, the call controller (not shown) may directly control a call connection with the external institution by means of a communication terminal embedded in the autonomous vehicle.

As an example, the call controller (not shown) may control a call connection with the external institution by means of the communication terminal in the autonomous vehicle, which is paired with the autonomous vehicle.

As an example, the call controller (not shown) may control a call with the external institution over a wireless communication network such as a telematics service.

The call controller (not shown) may transmit a call connection request to the external institution and may perform a real-time voice connection between the inside of the vehicle and the external institution through a real-time call connection with the external institution.

As an example, the call controller (not shown) may be electrically connected with a speaker and a microphone included in an audio, video, navigation (AVN) and may control a real-time voice connection with the external institution through a call connection, using the speaker and the microphone of the AVN.

Furthermore, the call controller (not shown) may be connected with the processor 220 to transmit and receive various pieces of information and a control command therebetween.

The processor 220 may perform the overall control such that respective components may normally perform their own functions. Such a processor 220 may be implemented in the form of hardware, may be implemented in the form of software, or may be implemented in the form of a combination thereof. Preferably, the processor 220 may be implemented as, but not limited to, a microprocessor. In addition, the processor 220 may perform a variety of data processing, calculation, and the like described below.

The processor 220 may perform a minimum risk maneuver (MRM) including deceleration control and stop control of the autonomous vehicle.

In detail, the MRM may include a maneuver through a driving strategy such as a strategy where an autonomous vehicle decelerates and stops on the lane by means of autonomous driving or a strategy where the autonomous vehicle makes a lane change to a shoulder to decelerate and stop by means of autonomous driving.

As an example, when an airbag of the autonomous vehicle is operated, when the autonomous vehicle or a system included in the autonomous vehicle fails, or when a transition demand (TD) occurs during autonomous driving of the autonomous vehicle and the TD is ended because a user does not take over control authority of the autonomous vehicle, the processor 220 may perform the MRM.

As an example, when there is a section where it is impossible to operate autonomous driving in front of a driving route, the processor 220 may output the TD in advance.

As an example, the processor 220 may output the TD during a predetermined specific time.

As an example, the processor 220 may output the TD to be recognized by a driver, by means of a device, such as an AVN or a cluster provided in the vehicle, which outputs a visual or audible signal.

As an example, after outputting the TD during the specific time, when control authority is not handed over to the driver, the processor 220 may perform the MRM.

As an example, the processor 220 may determine whether control authority is handed over to the user by means of whether manipulation of the user is input.

As another example, when the airbag of the autonomous vehicle is operated or when the autonomous vehicle or the system included in the autonomous vehicle fails, the processor 220 may determine that it is difficult to normally perform an operation of the autonomous driving to perform the MRM.

The processor 220 may determine whether the MRM is completed.

Based on determination that the MRM is completed, the processor 220 may determine whether manipulation of the user for vehicle control is not input during a specific time.

When the MRM is completed and when the manipulation of the user for the vehicle control is not input during the specific time, the processor 220 may request a call connection from an external institution by means of the call controller (not shown).

As an example, the manipulation of the user may include at least one of an input of an autonomous driving operation button provided in the autonomous vehicle, holding of a steering wheel of the autonomous vehicle, manipulation of the steering wheel, an input of a brake provided in the autonomous vehicle, or an operation of a brake override system of the autonomous vehicle.

As an example, the processor 220 may be electrically connected with the autonomous driving operation button provided in the autonomous vehicle to detect an input of the autonomous driving operation button.

As an example, the processor 220 may detect whether the steering wheel is held and/or manipulation of the steering wheel, by means of a sensor provided in the steering wheel of the autonomous vehicle.

As an example, the processor 220 may be connected with a processor which manages the brake override system of the autonomous vehicle to identify whether the brake override system is operated.

Other than the exemplified manipulation, when a signal determined that it is able for the user to show an intention to control the vehicle is input, the processor 220 may request a call connection from the external institution by means of the call controller (not shown).

As an example, the processor 220 may deliver a command to request the call connection from the external institution to the call controller (not shown).

Although not illustrated, as an example, the apparatus 200 for controlling the autonomous vehicle may further include a human machine interface (HMI) which is provided in the autonomous vehicle to receive a cancel command for a call connection from the user.

As an example, the HMI may include an input module which receives a control signal from the user and generates a control signal according to an input from the outside. As an example, the input module may be configured as an input device such as a keypad, a touch pad, or a touch screen. When the input module is configured as the touch screen, the input module may perform a function of an output module together.

As an example, the HMI may include an AVN provided in the autonomous vehicle and may receive a cancel command for a call connection by means of the AVN.

When the cancel command is input through the HMI, the processor 220 may cancel the request for the call connection.

As an example, the processor 220 may deliver a command to cancel the request for the call connection from the external institution to the call controller (not shown).

Although not illustrated, as an example, the apparatus 200 for controlling the autonomous vehicle may further include a door controller which controls a door of the autonomous vehicle to be locked or unlocked.

As an example, the door controller may lock or unlock of one or more doors of the autonomous vehicle by means of an electrical signal.

As an example, the door controller may control the door of the autonomous vehicle to be locked or unlocked, based on the command received from the processor 220.

As an example, when requesting the call connection, the processor 220 may unlock the door by means of the door controller.

As an example, the processor 220 may deliver a door unlock command to the door controller to unlock doors at all seats, which are provided in the autonomous vehicle.

As another example, when an agent call occurs in response to the call connection, the processor 220 may unlock the door by means of the door controller.

As an example, the processor 220 may identify whether the agent call occurs in response to the call connection, by means of the call controller (not shown).

As an example, when an agent call signal is received in response to a signal requesting the call connection, the call controller (not shown) may deliver a signal providing a notification that the agent call occurs to the processor 220.

As an example, when a door lock button of the autonomous vehicle is input by the user, the processor 220 may lock the door by means of the door controller.

As an example, the autonomous vehicle may have the door lock button. As an example, the processor 220 may identify whether the door lock button provided in the autonomous vehicle is input.

As an example, when the speed of the autonomous vehicle arrives at a specific speed by manipulation of the user or when a shift lever of the autonomous vehicle is manipulated by the user, the processor 220 may lock the door by means of the door controller.

As an example, when the cancel command is input through the HMI, the processor 220 may maintain the door in a lock state by means of the door controller.

When the cancel command is input through the HMI and when not transmitting a signal instructing to unlock the door to the door controller or when the signal instructing to unlock the door is already transmitted to the door controller, the processor 220 may transmit a signal instructing to lock the door to the door controller again.

As an example, the processor 220 may be connected with a speed sensor and/or the shift lever provided in the autonomous vehicle to obtain information about at least one of a driving speed of the autonomous vehicle or whether the shift lever is manipulated.

As an example, when manipulation of the user is input while the MRM is being performed, the processor 220 may disable autonomous driving of the autonomous vehicle.

As an example, when the manipulation of the user is input while the MRM is being performed, the processor 220 may end the MRM and may determine that the user takes over control authority to disable autonomous driving, thus handing over the control authority to the user.

Figure 3:
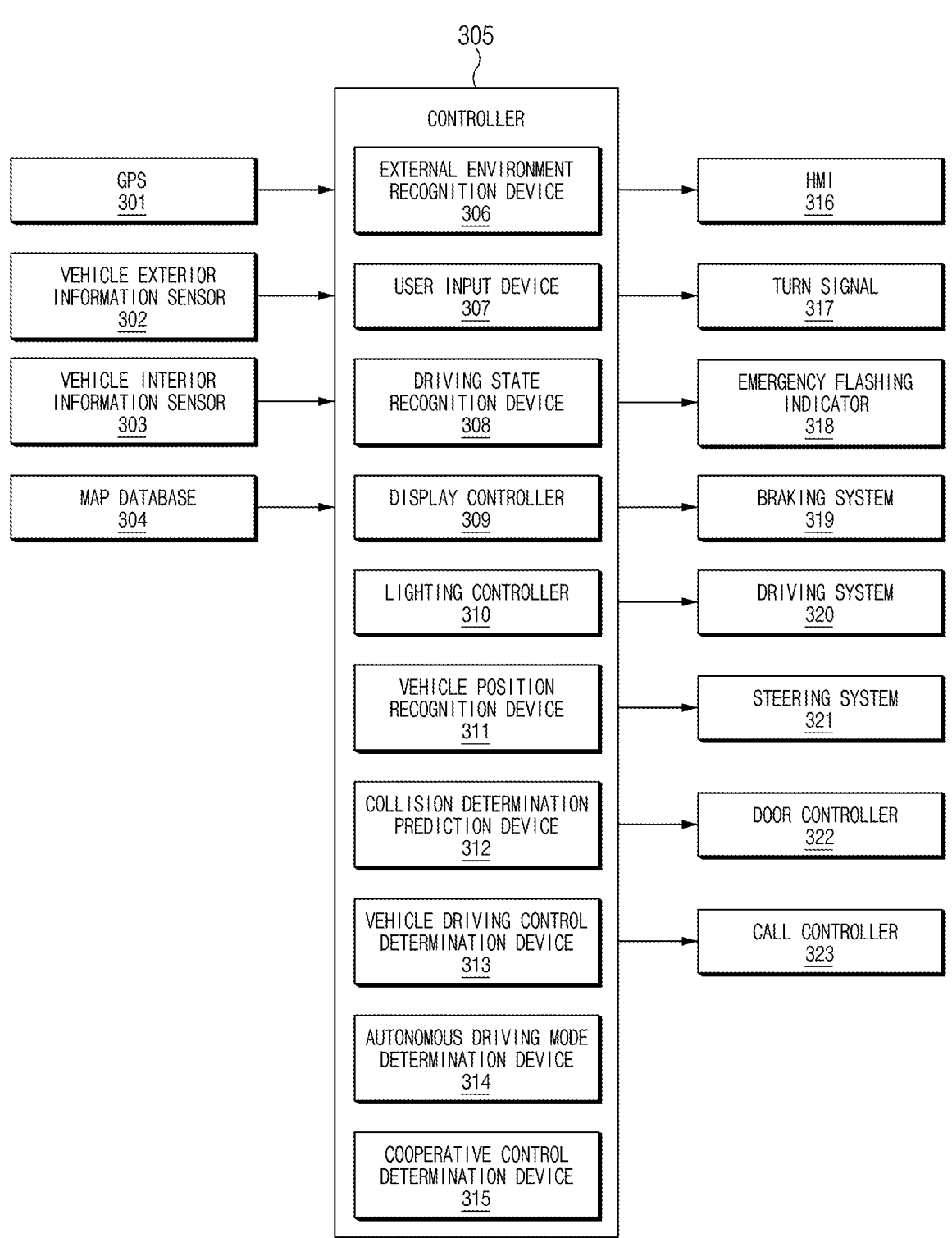
FIG. 3 is a block diagram illustrating a detailed configuration of an apparatus for controlling an autonomous vehicle according to an exemplary embodiment of the present disclosure.

FIG. 3 is a block diagram illustrating a detailed configuration of an apparatus for controlling an autonomous vehicle according to an exemplary embodiment of the present disclosure.

Referring to FIG. 3, a controller 305 may obtain various pieces of information from a global positioning system (GPS) 301, a vehicle exterior information sensor 302, a vehicle interior information sensor 303, and a map database 304.

As an example, the GPS 301 may obtain information about a position of the autonomous vehicle and may deliver the obtained information to the controller 305.

As an example, the vehicle exterior information sensor 302 may obtain information about a surrounding object around the autonomous vehicle and may deliver the obtained information to the controller 305.

As an example, the vehicle exterior information sensor 302 may include at least one of a camera, a light detection and ranging (LiDAR), or a radar.

As an example, the vehicle interior information sensor 303 may obtain information about at least one of whether an airbag of the autonomous vehicle is operated, when a steering wheel is manipulated, when the steering wheel is held, when an autonomous driving operation button provided in the autonomous vehicle is manipulated, whether a brake override system is operated, or whether a door lock button is input and may deliver the obtained information to the controller 305.

As an example, the controller 305 may receive high definition map information around the autonomous vehicle from the map database 304.

The controller 305 may include an external environment recognition device 306, a user input device 307, a driving state recognition device 308, a display controller 309, a lighting controller 310, a vehicle position recognition device 311, a collision determination prediction device 312, a vehicle driving control determination device 313, an autonomous driving mode determination device 314, and a cooperative control determination device 315.

As an example, the controller 305 may include a processor for performing calculation and/or data processing described below. The components 306 to 315 included in the controller 305 may be implemented by means of one or more processors. As an example, the controller 305 may include an ECU of the autonomous vehicle.

As an example, the external environment recognition device 306 may determine an environment outside the autonomous vehicle, based on the information delivered from the vehicle exterior information sensor 302 and the high definition map information delivered from the map database 304 and may deliver the determined information to the autonomous driving control determination device 313.

As an example, the user input device 307 may identify whether manipulation of a user for vehicle control is input.

As an example, the user input device 307 may identify whether cancellation for a call connection request is input, by means of an HMI 316.

As an example, the driving state recognition device 308 may determine a driving state of the autonomous vehicle, based on the information delivered from the vehicle exterior information sensor 302 and the high definition map information delivered from the map database 304 and may deliver the determined information to the autonomous driving control determination device 313.

As an example, the display controller 309 may control information displayed on the HMI 316 of the autonomous vehicle.

As an example, the display controller 309 may display information about an MRM on the HMI 316 of the autonomous vehicle.

As an example, the lighting controller 310 may control lighting of a turn signal 317 and an emergency flashing indicator 318 of the autonomous vehicle.

As an example, when the autonomous vehicle is stopped by means of the MRM, the lighting controller 310 may turn on the turn signal 317 and/or the emergency flashing indicator 318.

As an example, the vehicle position recognition device 311 may recognize a position of the autonomous vehicle based on the information delivered through the GPS 301.

As an example, the collision determination prediction device 312 may determine and predict a collision of the autonomous vehicle, based on the information delivered from the vehicle exterior information sensor 302.

As an example, the vehicle driving control determination device 313 may control autonomous driving of the autonomous vehicle depending on a predetermined autonomous driving strategy, by means of a braking system 319, a driving system 320, and a steering system 321.

As an example, the autonomous driving mode determination device 314 may determine whether to perform an MRM of the autonomous vehicle.

As an example, the cooperative control determination device 315 may determine whether to request a call connection from an external institution, by means of a call controller 323.

Herein, cooperative control may refer to controlling a vehicle to rescue a driver in danger, by means of cooperation with the external institution.

As an example, when requesting a call connection from the external institution by means of a door controller 322, the controller 305 may control a door of the autonomous vehicle to be unlocked.

Figure 4:
FIG. 4 is a drawing illustrating that an apparatus for controlling an autonomous vehicle requests a call connection from an external institution according to an exemplary embodiment of the present disclosure.

FIG. 4 is a drawing illustrating that an apparatus for controlling an autonomous vehicle requests a call connection from an external institution according to an exemplary embodiment of the present disclosure.

Referring to FIG. 4, a controller 401 may deliver a control command to a call controller 402 through a controller area network (CAN) communication in the vehicle.

However, the communication between the controller 401 and the call controller 402 is not limited to the CAN communication, which may be implemented through an inter-vehicle communication such as local interconnect network (LIN) communication or Ethernet communication.

The call controller 402 may control a call with an external institution 403 through wireless communication.

As an example, the call controller 402 may control a call with the external institution 403, by means of a communication module provided in the autonomous vehicle, which communicate with the external institution 403.

As an example, the external institution 403 may include a call center server which manages an emergency service.

The external institution 403 may transmit a signal corresponding to an agent connection call to the call controller 402 in response to a call connection request.

Figure 5:
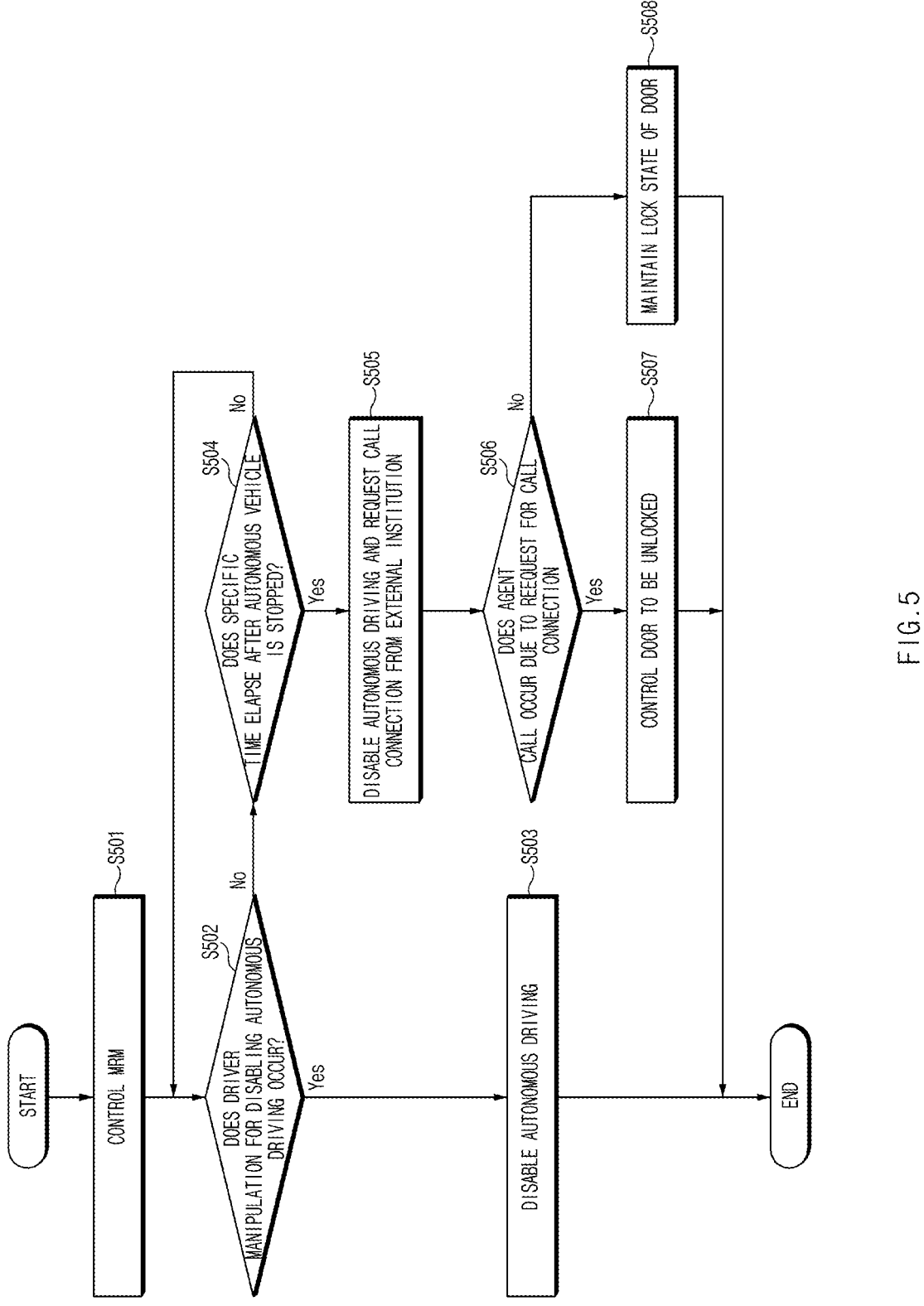
FIG. 5 is a flowchart illustrating an operation of an apparatus for controlling an autonomous vehicle according to an exemplary embodiment of the present disclosure.

FIG. 5 is a flowchart illustrating an operation of an apparatus for controlling an autonomous vehicle according to an exemplary embodiment of the present disclosure.

Hereinafter, it is assumed that an apparatus 200 for controlling an autonomous vehicle in FIG. 2 performs a process of FIG. 5. Furthermore, in a description of FIG. 5, an operation described as being performed by the apparatus for controlling the autonomous vehicle may be understood as being controlled by a processor 220 of the apparatus 200 for controlling the autonomous vehicle.

Referring to FIG. 5, in S501, the apparatus for controlling the autonomous vehicle may control an MRM.

As an example, when a predetermined MRM condition is met, the apparatus for controlling the autonomous vehicle may perform the MRM of performing deceleration control until the autonomous vehicle is stopped.

In S502, the apparatus for controlling the autonomous vehicle may identify whether driver manipulation for disabling autonomous driving occurs.

As an example, the driver manipulation may include at least one of holding of a steering wheel of the autonomous vehicle, manipulation of the steering wheel, an input of a brake or accelerator pedal provided in the autonomous vehicle, or an operation of a brake override system of the autonomous vehicle.

When the driver manipulation for disabling the autonomous driving occurs, in S503, the apparatus for controlling the autonomous vehicle may disable the autonomous driving.

As an example, when the driver manipulation for disabling the autonomous driving occurs, the apparatus for controlling the autonomous vehicle may disable the autonomous driving and may hand over control authority of the autonomous vehicle to a driver.

When the driver manipulation for disabling the autonomous driving does not occur, in S504, the apparatus for controlling the autonomous vehicle may identify whether a specific time elapses after the autonomous vehicle is stopped.

When the specific time does not elapse after the autonomous vehicle is stopped, the apparatus for controlling the autonomous vehicle may return to S502 to identify whether driver manipulation for disabling autonomous driving occurs.

When the specific time elapses after the autonomous vehicle is stopped, in S505, the apparatus for controlling the autonomous vehicle may disable the autonomous driving and may request a call connection from an external institution.

In S506, the apparatus for controlling the autonomous vehicle may identify whether an agent call occurs due to the request for the call connection.

When the agent call occurs due to the request for the call connection, in S507, the apparatus for controlling the autonomous vehicle may control a door of the autonomous vehicle to be unlocked.

When the agent call does not occur due to the call connection request, in S508, the apparatus for controlling the autonomous vehicle may maintain a lock state of the door of the autonomous vehicle.

Figure 6:
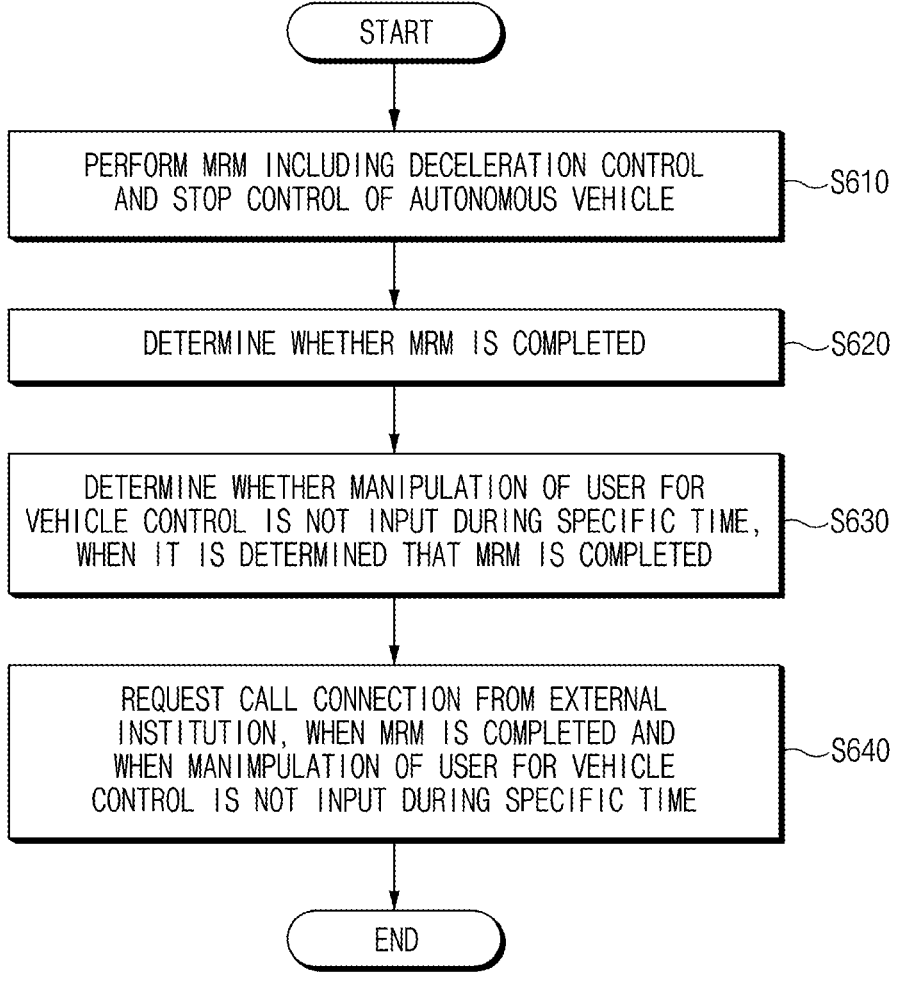
FIG. 6 is a flowchart illustrating a method for controlling an autonomous vehicle according to an exemplary embodiment of the present disclosure.

FIG. 6 is a flowchart illustrating a method for controlling an autonomous vehicle according to an exemplary embodiment of the present disclosure.

Referring to FIG. 6, the method for controlling the autonomous vehicle may include performing (S610) an MRM including deceleration control and stop control of the autonomous vehicle, determining (S620) whether the MRM is completed, determining (S630) whether manipulation of a user for vehicle control is not input during a specific time, based on determination that the MRM is completed, and requesting (S640) a call connection from an external institution, when the MRM is completed and when the manipulation of the user for the vehicle control is not input during the specific time.

The performing (S610) of the MRM including the deceleration control and the stop control of the autonomous vehicle may be performed by a processor.

As an example, the performing (S610) of the MRM including the deceleration control and the stop control of the autonomous vehicle may include disabling, by the processor, autonomous driving of the autonomous vehicle, when manipulation of a user is input while the MRM is being performed.

The determining (S620) of whether the MRM is completed may be performed by the processor.

The determining (S630) of whether the manipulation of the user for the vehicle control is not input during the specific time, based on determination that the MRM is completed, may be performed by the processor.

The requesting (S620) of the call connection from the external institution, when the MRM is completed and when the manipulation of the user for the vehicle control is not input during the specific time, may be performed by the processor and a call controller provided in the autonomous vehicle.

As an example, the method for controlling the autonomous vehicle may further include receiving, by an HMI provided in the autonomous vehicle, a cancel command for the call connection from the user and canceling, by the processor, a request for the call connection, when the cancel command is input through the HMI.

As an example, the receiving of the cancel command for the call connection from the user by the HMI provided in the autonomous vehicle may include receiving, by the HMI, the cancel command for the call connection through an AVN provided in the autonomous vehicle.

As an example, the method for controlling the autonomous vehicle may further include unlocking, by the processor, a door of the autonomous vehicle by means of a door controller for controlling the door of the autonomous vehicle to be locked or unlocked, when requesting the call connection.

As an example, the method for controlling the autonomous vehicle may further include locking, by the processor, the door by means of the door controller, when a door lock button of the autonomous vehicle is input.

As an example, the method for controlling the autonomous vehicle may further include locking the door by means of the door controller, when a speed of the autonomous vehicle arrives at a specific speed by manipulation of the user or when a shift lever of the autonomous vehicle is manipulated by the user.

As an example, the method for controlling the autonomous vehicle may further include receiving, by an HMI provided in the autonomous vehicle, a cancel command for the call connection from the user and maintaining, by the processor, the door in a lock state by means of the door controller, when the cancel command is input through the HMI.

As an example, the method for controlling the autonomous vehicle may further include unlocking, by the processor, a door of the autonomous vehicle by means of a door controller for controlling the door of the autonomous vehicle to be locked or unlocked, when an agent call occurs in response to the call connection.

The operations of the method or the algorithm described in connection with the embodiments disclosed herein may be embodied directly in hardware or a software module executed by the processor or in a combination thereof. The software module may reside on a storage medium (that is, the memory/or the storage) such as a RAM, a flash memory, a ROM, an EPROM, an EEPROM, a register, a hard disk, a removable disk, and a CD-ROM.

The exemplary storage medium may be coupled to the processor, and the processor may read information out of the storage medium and may record information in the storage medium. Alternatively, the storage medium may be integrated with the processor. The processor and the storage medium may reside in an application specific integrated circuit (ASIC). The ASIC may reside within a user terminal. In another case, the processor and the storage medium may reside in the user teminal as separate components.

A description will be given of effects of the apparatus for controlling the autonomous vehicle and the method thereof according to an exemplary embodiment of the present disclosure.

According to at least one of embodiments of the present disclosure, the apparatus for controlling the autonomous vehicle and the method thereof may be provided for a minimum risk maneuver (MRM) of the autonomous vehicle.

Furthermore, according to at least one of embodiments of the present disclosure, the apparatus for controlling the autonomous vehicle and the method thereof may be provided to allow a driver to determine and cope with a critical situation.

Furthermore, according to at least one of embodiments of the present disclosure, the apparatus for controlling the autonomous vehicle and the method thereof may be provided to request help from an external institution in a critical situation.

Furthermore, according to at least one of embodiments of the present disclosure, the apparatus for controlling the autonomous vehicle and the method thereof may be provided to control a door of the autonomous vehicle to smoothly proceed with rescue in a critical situation.

Furthermore, according to at least one of embodiments of the present disclosure, the apparatus for controlling the autonomous vehicle and the method thereof may be provided to improve safety and convenience of an autonomous driving system.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. A method for controlling an autonomous vehicle, the method comprising:
based on determination that a driver of the vehicle does not take over control authority during a specific time after outputting a transition demand from an existing autonomous driving system of the autonomous vehicle to the driver, performing, by a processor, a minimum risk maneuver (MRM) comprising deceleration control and stop control of the autonomous vehicle;
determining, by the processor, that the MRM is completed based on stopping the vehicle;
after the MRM is completed, monitoring, by the processor, manipulation of a user for disabling autonomous driving for a specific time;
determining, by the processor, that the manipulation of the user is not input during the specific time;
determining, by the processor, not to take over control authority of the autonomous vehicle based on the determination that the manipulation of the user is not input during the specific time; and
requesting, by processor, a call connection from an external institution, through a communication terminal, after determining that the control authority of the autonomous vehicle does not take over.

2. The method of claim 1, further comprising:
receiving, by an HMI provided in the autonomous vehicle, a cancel command for the call connection from the user; and
canceling, by the processor, the request for the call connection, after the cancel command is input through the HMI.

3. The method of claim 2, wherein the receiving of the cancel command for the call connection from the user by the HMI comprises:
receiving, by the HMI, the cancel command for the call connection through an AVN provided in the autonomous vehicle.

4. The method of claim 1, further comprising:
unlocking, by the processor, a door of the autonomous vehicle, using a door controller configured to control the door of the autonomous vehicle to be locked or unlocked, after requesting the call connection.

5. The method of claim 4, further comprising:
locking, by the processor, the door using the door controller, after a door lock button of the autonomous vehicle is input by the user.

6. The method of claim 4, further comprising:
locking, by the processor, the door using the door controller, after a speed of the autonomous vehicle arrives at a specific speed by manipulation of the user or after a shift lever of the autonomous vehicle is manipulated by the user.

7. The method of claim 4, further comprising:
receiving, by an HMI provided in the autonomous vehicle, a cancel command for the call connection from the user; and
maintaining, by the processor, the door in a lock state, after the cancel command is input through the HMI.

8. The method of claim 1, further comprising:
unlocking, by the processor, a door of the autonomous vehicle using a door controller configured to control the door of the autonomous vehicle to be locked or unlocked, after an agent call occurs in response to the call connection.

9. The method of claim 1, wherein the performing of the MRM by the processor comprises:
disabling, by the processor, autonomous driving of the autonomous vehicle, after the manipulation of the user is input while the MRM is being performed.

10. An apparatus for controlling an autonomous vehicle, the apparatus comprising:
a processor provided in the autonomous vehicle; and
a memory storing instructions executable by the processor,
wherein the processor is configured to:
based on determination that a driver of the vehicle does not take over control authority during a specific time after outputting a transition demand from an existing autonomous driving system of the autonomous vehicle to the driver, perform a minimum risk maneuver (MRM) comprising deceleration control and stop control of the autonomous vehicle,
determine that the MRM is completed based on stopping the vehicle,
after the MRM is completed, monitor manipulation of a user for disabling autonomous driving for a specific time;
based on determination that the manipulation of the user is not input during the specific time, determine to not take over control authority of the autonomous vehicle; and
request a call connection from an external institution, through a communication terminal, after determining that the control authority of the autonomous vehicle does not take over.

11. The apparatus of claim 10, further comprising:
a human machine interface (HMI) provided in the autonomous vehicle and configured to receive a cancel command for the call connection from the user,
wherein the processor cancels the request for the call connection, when the cancel command is input through the HMI.

12. The apparatus of claim 11, wherein the HMI receives the cancel command for the call connection through an audio, video, navigation (AVN) provided in the autonomous vehicle.

13. The apparatus of claim 10, further comprising:
a door controller configured to control a door of the autonomous vehicle to be locked or unlocked,
wherein the processor is further configured to unlock the door, using the door controller, when requesting the call connection.

14. The apparatus of claim 13, wherein the processor is further configured to lock the door using the door controller, when a door lock button of the autonomous vehicle is input by the user.

15. The apparatus of claim 13, wherein the processor is further configured to lock the door using the door controller, when a speed of the autonomous vehicle arrives at a specific speed by manipulation of the user or when a shift lever of the autonomous vehicle is manipulated by the user.

16. The apparatus of claim 13, further comprising:
an HMI provided in the autonomous vehicle and configured to receive a cancel command for the call connection from the user, wherein the processor is further configured to maintain the door in a lock state, using the door controller, when the cancel command is input through the HMI.

17. The apparatus of claim 10, further comprising:

a door controller configured to control a door of the autonomous vehicle to be locked or unlocked, wherein the processor is further configured to unlock the door, using the door controller, when an agent call occurs in response to the call connection.

18. The apparatus of claim 10, wherein the processor disables autonomous driving of the autonomous vehicle, when the manipulation of the user is input while the MRM is being performed.

19. The apparatus of claim 10, wherein the manipulation of the user comprises at least one of an input of an autonomous driving operation button provided in the autonomous vehicle, holding of a steering wheel of the autonomous vehicle, manipulation of the steering wheel, an input of a brake provided in the autonomous vehicle, or an operation of a brake override system of the autonomous vehicle.

20. The apparatus of claim 10, wherein the processor is further configured to perform the MRM, when an airbag of the autonomous vehicle is operated, when the autonomous vehicle or a system included in the autonomous vehicle fails, or when a request for transition of control authority from the autonomous vehicle to the user occurs during autonomous driving of the autonomous vehicle and after the request is ended because the user does not take over control authority of the autonomous vehicle.

\* \* \* \* \*